(12) United States Patent
Yang

(10) Patent No.: US 10,591,773 B2
(45) Date of Patent: Mar. 17, 2020

(54) BACKLIGHT MODULE AND LIQUID CRYSTAL DISPLAY DEVICE

(71) Applicants: BOE Technology Group Co., Ltd., Beijing (CN); K-tronics (Su Zhou) Technology Co., Ltd., Suzhou (CN)

(72) Inventor: Zhou Yang, Beijing (CN)

(73) Assignees: BOE TECHNOLOGY GROUP CO., LTD., Beijing (CN); K-TRONICS (SU ZHOU) TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 15/745,024

(22) PCT Filed: Jul. 31, 2017

(86) PCT No.: PCT/CN2017/095115
§ 371 (c)(1),
(2) Date: Jan. 15, 2018

(87) PCT Pub. No.: WO2018/133361
PCT Pub. Date: Jul. 26, 2018

(65) Prior Publication Data
US 2019/0011781 A1  Jan. 10, 2019

(30) Foreign Application Priority Data
Jan. 17, 2017  (CN) ..................... 2017 2 0058887 U

(51) Int. Cl.
*G02F 1/1335* (2006.01)
*G02F 1/1333* (2006.01)

(52) U.S. Cl.
CPC .. *G02F 1/133606* (2013.01); *G02F 1/133308* (2013.01); *G02F 1/133603* (2013.01);
(Continued)

(58) Field of Classification Search
CPC ......... G02F 1/133606; G02F 1/133308; G02F 1/133605; G02F 2001/133317;
(Continued)

(56) References Cited

U.S. PATENT DOCUMENTS

| 8,876,320 B2 | 11/2014 | Ying |
| 2008/0013315 A1 | 1/2008 | Kim et al. |

(Continued)

FOREIGN PATENT DOCUMENTS

| CN | 101042488 A | 9/2007 |
| CN | 102644883 A | 8/2012 |

(Continued)

OTHER PUBLICATIONS

English translation of International Search Report for International Application No. PCT/CN2017/095115, dated Sep. 6, 2017, 5 pages.

(Continued)

*Primary Examiner* — Anh T Mai
*Assistant Examiner* — Jessica M Apenteng
(74) *Attorney, Agent, or Firm* — Westman, Champlin & Koehler, P.A.

(57) ABSTRACT

The present disclosure relates to a backlight module and a display device. The backlight module includes: a back plate; a reflective sheet and a plurality of light sources sequentially disposed at one side of the back plate; and an optical film disposed at one side of the reflective sheet facing away from the back plate and at a given distance between the reflective sheet, characterized in that it further includes: at least one transflective film disposed at one side of the optical film facing the light source.

8 Claims, 3 Drawing Sheets

(52) U.S. Cl.
CPC ............... *G02F 1/133605* (2013.01); *G02F 2001/13332* (2013.01); *G02F 2001/133317* (2013.01); *G02F 2001/133607* (2013.01)

(58) Field of Classification Search
CPC ..... G02F 1/133603; G02F 2001/13332; G02F 2001/133607
USPC ...................................................... 362/97.2
See application file for complete search history.

(56) References Cited

U.S. PATENT DOCUMENTS

2012/0243208 A1    9/2012  Ying
2017/0184910 A1*  6/2017  Lee ........................ G02B 6/005

FOREIGN PATENT DOCUMENTS

| CN | 101046576 A | 10/2017 |
|---|---|---|
| TW | 200500731 A | 1/2005 |

OTHER PUBLICATIONS

English translation of Box No. 5 of Written Opinion for International Application No. PCT/CN2017/095115, dated Sep. 6, 2017, 2 pages.

\* cited by examiner

BACKLIGHT MODULE AND LIQUID CRYSTAL DISPLAY DEVICE

CROSS-REFERENCE TO RELATED APPLICATION

This application is a Section 371 National Stage Application of International Application No. PCT/CN2017/095115, filed Jul. 31, 2017, which is not yet published, and claims the benefit of Chinese Patent Application No. 201720058887.9 filed on Jan. 17, 2017 in the State Intellectual Property Office of China, the whole disclosure of which are incorporated herein by reference.

BACKGROUND OF THE INVENTION

Field of the Invention

The present invention relates to the field of display technology, and in particular, to a backlight module and a liquid crystal display device.

Description of the Related Art

Depending on locations of the light sources, the backlight module can be classified as a side type and a direct type. The backlight module of the direct type is mainly applied to a liquid crystal display device with large-size gradually become prominent. However, the thickness of the conventional backlight module of the direct type becomes an important factor that hinders its development. This is due to the fact that thickness and optical quality of the backlight module of the direct type constraint mutually. In a condition that the thickness is large, the backlight module has a relatively large light mixing distance, and thus has a relative good optical quality. While in a condition that the thickness is decreased, the light mixing distance thereof becomes smaller, which fact may readily result in a light shadow and in turn a degraded optical quality, as well as glare which causes injury to the human eyes. In order to obtain a compromise between the thickness and the optical quality of the backlight module of the direct type, usually methods are used such as increasing the number of light sources, changing the light pattern of the lens of the light sources, increasing the thickness of the diffusion plate and haze factor thereof, increasing the number of optical films, which results in increased costs, thereby being not conducive to ultra-thin LCD devices.

SUMMARY OF THE INVENTION

The embodiments of the present disclosure provide a backlight module, comprising:
a back plate;
a reflective sheet and a plurality of light sources sequentially disposed at one side of the back plate; and
an optical film disposed at one side of the reflective sheet facing away from the back plate and at a given distance from the reflective sheet,
wherein the backlight module further comprises at least one transflective film disposed at one side of the optical film facing the light sources.

In an optional embodiment, the number of the transflective films is the same as the number of light sources, and the transflective films are arranged in a one-to-one correspondence with the light sources.

In an optional embodiment, each transflective film is in a shape of central symmetry, and an orthographic projection of a centroid of the transflective film on the back plate coincides with a light emission center of a corresponding light source.

In an optional embodiment, the transflective film is in a shape of circular or regular polygon.

In an optional embodiment, an area of the transflective film is larger than an area of the light source.

In an optional embodiment, a maximum width of each transflective film and a maximum width of a corresponding light source satisfy a relation: $2H<L<6H$;

where H is the maximum width of the light source and L is the maximum width of the transflective film.

In an optional embodiment, the transflective film is supported by a supporting member; or the transflective film is directly attached to the optical film.

In an optional embodiment, the optical film includes a prism sheet.

In an optional embodiment, the backlight module further comprises:
a middle frame for fixing the optical film on the back plate, and
a front frame for fixing the backlight module to a display screen provided on a side of the light-emitting surface of the backlight module.

The embodiments of the present disclosure further provide a liquid crystal display device, comprising the backlight module according to claim 1.

DETAILED DESCRIPTION OF PREFERRED EMBODIMENTS

Figure 1:
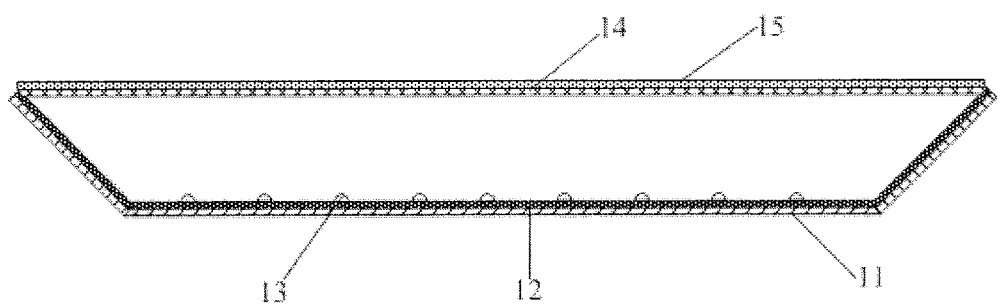
FIG. 1 is a schematic structural view of a backlight module in the prior art.

FIG. 1 is a schematic structural view of a backlight module of the direct type in the prior art. As shown in FIG. 1, the backlight module of the direct type in the prior art includes a back plate 11, a reflective sheet 12, light sources 13, a diffusion sheet 14, and an optical film 15. The light emitted from the light source 13 is directly incident on, or is reflected by the reflective sheet 12 so as to be incident into the diffusion sheet 14. The diffusion sheet 14 diffuses the incident light and broadens a viewing angle. Finally, the light passes through the optical film 15 and is incident on a liquid crystal display screen. In the backlight module of the direct type, the light mixing distance is usually the thickness of a cavity of the backlight module, that is, a distance between the diffusion sheet and the light source. The greater the light mixing distance is, the more uniform the light emitted by the light source is and the better the optical quality is. If it is required to increase the light mixing distance of the backlight module in the prior art, then the thickness of the cavity needs to be increased, which inevitably results in an increase in an overall thickness of the backlight module and thus fails to achieve an ultrathin display device.

Figure 2:
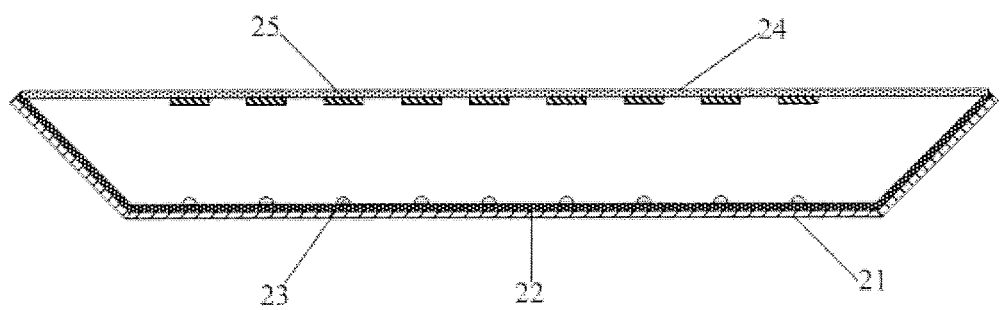
FIG. 2 is a schematic structural view of a backlight module according to an embodiment of the present disclosure.

In view of this, a backlight module is provided in embodiments of the present disclosure, which improves the optical quality of the backlight module with a reduced cost, without increasing the thickness thereof. As shown in FIG. 2, a backlight module according to an embodiment of the present disclosure includes a back plate 21, a reflective sheet 22 and a plurality of light sources 23 sequentially disposed at one side of the back plate, and an optical film 24 disposed at one side of the reflective sheet 22 facing away from the back plate 21 and at a given distance from the reflective sheet 22. It further includes at least one transflective film 25 located at a side of the optical film 24 facing the light sources 23.

Figure 3:
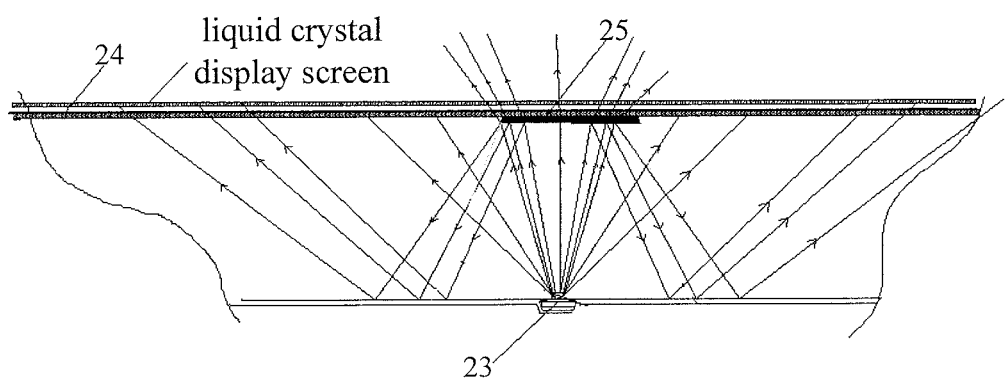
FIG. 3 is a schematic view of an optical path of a backlight module according to an embodiment of the present disclosure.

In a specific embodiment, the intensity of a central part of an emergent light beam of one of the light sources 23 is relatively large, but the uniformity of this part of the light beam is relatively poor. Therefore, the above-mentioned transflective film provided by the embodiments of the present disclosure is designed for such a part of the light beam. As shown in FIG. 3, for a light beam with relatively poor uniformity, the transflective film transmits a part of the light directly to the optical film 24, but return the other part of the light to the reflective sheet 22 again and transmits them to the optical film 24 after being reflected by a second reflection of the reflective sheet. Thus, after the second reflection of the reflective sheet 22, the mixing distance of the part of the light beam is increased without changing an original thickness of the backlight module, and the uniformity of the light beam in the center of the light source is improved. In addition, since the light undergoes a secondary reflection and the light exit angle thereof is broaden, so it is not needed to provide a diffusion sheet to broaden the view angle, thus resulting in a saved cost and an even slimmer backlight module.

Optionally, the backlight module provided by the embodiment of the present disclosure, as shown in FIG. 2, includes a plurality of transflective films 25, and the transflective films 25 are aligned with the light sources 23 one by one. That is, a transflective film 25 is disposed at a position aligned with the light emitted from each light source 23 at a side of the optical film 24 facing the light sources 23 so as to improve the uniformity of light emitted from each light source 23.

In a specific embodiment, in the above backlight module provided by the embodiments of the present disclosure, the transflective film 25 is in a shape of central symmetry, and an orthographic projection of a centroid of the transflective film 25 on the back plate 21 coincides with a light emission center of the light source 23. As described above, since the uniformity of the central part of the light emitted from the light source 23 is relatively poor, it is necessary to dispose the transflective film 25 in front of the corresponding light source 23 in a light exit direction, in order to reflect this part of the light twice to increase the light mixing distance thereof.

Further, in the above backlight module provided by the embodiments of the present disclosure, the transflective film 25 may be in a shape of circular or regular polygon. For example, the transflective film 25 may be a square, a regular hexagon, or the like. It should be noted that, in the above backlight module provided by the embodiment of the present disclosure, the light source 23 may be a hemispherical point light source whose emitted light is central symmetrical. Therefore, the transflective film is also central symmetrical so as to be adapted to this type of light source. On the other hand, after changing the manner of light exiting the light sources 23, the corresponding transflective film is also changed adaptively, as long as the transflective film 25 may act on the part of the light of the light source 23 having poor uniformity. In this embodiment, the shape of the transflective film is not limited.

Figure 4:
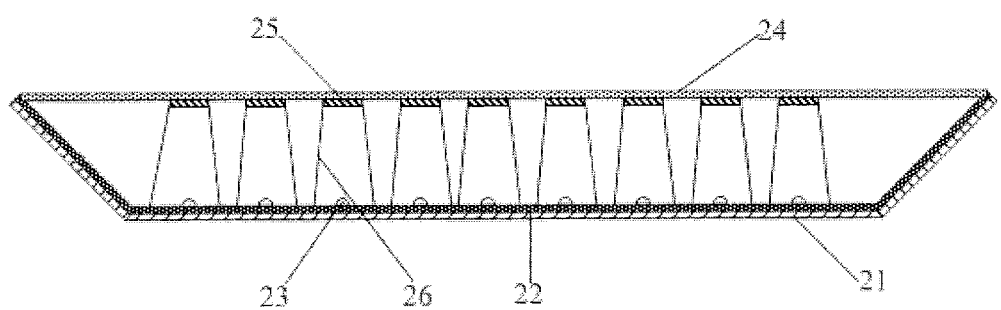
FIG. 4 is another schematic structural view of a backlight module according to an embodiment of the present disclosure.

When being specifically implemented, the backlight module provided by the embodiments of the present disclosure, as shown in FIG. 4, further includes a supporting member 26 for supporting the transflective film 25. The supporting member 26 may not only support the transflective film 25 but also support other optical films (such as the optical film 24) located on the cavity.

Figure 5:
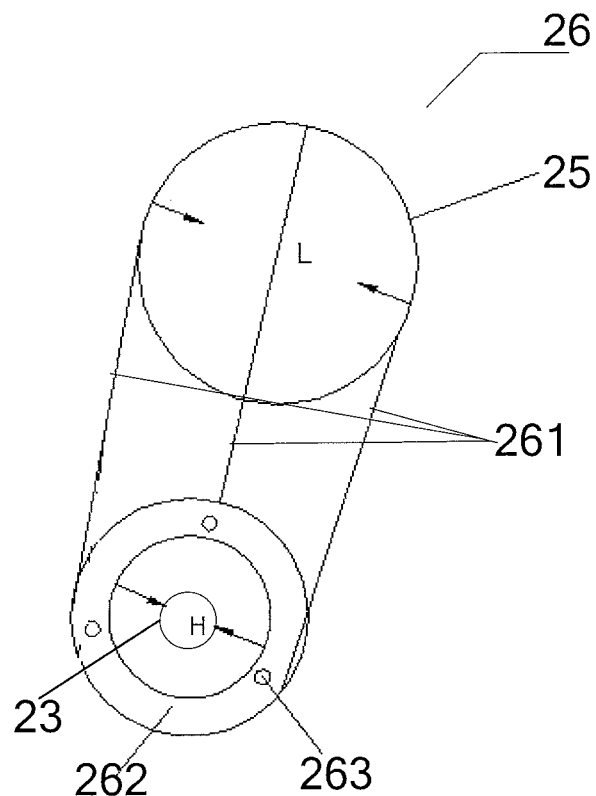
FIG. 5 is a schematic structural view of a bracket provided by an embodiment of the present disclosure.

Further, as shown in FIG. 5, the supporting member 26 includes a bracket 261 for supporting the transflective film 25, a hollow base 262 connected to the bracket 261, and a positioning hole 263 for fixing the base on the substrate. The light source 23 may be disposed in a center of the hollowed area of the base 262, and the transflective film supported by the bracket 261 acts on a part of the light of the light source 23.

In practice, since a distance between the transflective film 25 and the corresponding light source 23 is a certain value, it is generally considered that the thickness of the cavity of the backlight module is the distance between the light source 23 and the transflective film 25. The farther away from the light source is, the more serious the divergence of the light beam is. Therefore, the area of the transflective film 25 needs to be set depending on the above distance.

Specifically, the area of the transflective film 25 is larger than an area of the light source 23. Further, as shown in FIG. 5, the transflective film 25 may be circular, and the shape of the light source 23 on the back plate is also circular. A diameter L of the transflective film 25 is larger than a diameter H of the light source 23. In general, the light source has a divergence angle of 60 degrees or less has a relatively large intensity and a relatively poor uniformity. Taking the hemispherical point light source as an example, a maximum width (i.e., diameter) of the light source is usually 7-8 mm, and the distance between the light source 23 and the transflective film 25 may be usually 18-32 mm. Therefore, a relation $2H<L<6H$ is satisfied between a width of the transflective film acting on the light beam having a divergence angle of 60 degrees or less and the width of the light source, where H represents the maximum width of the light source (e.g., the diameter of a circular light source) and L represents the maximum width of the transflective film (e.g., the diameter of a transflective film in a shape of circular).

In another embodiment, the transflective film 25 may also be directly attached to the optical film 24, thereby reducing components and further reducing costs.

When being specifically implemented, in the above backlight module provided in the embodiments of the present disclosure, the optical film 24 may include a prism sheet. In addition, the optical film 24 may further include other functional films for providing the backlight module with other optical properties, which is not limited herein.

Figure 6:
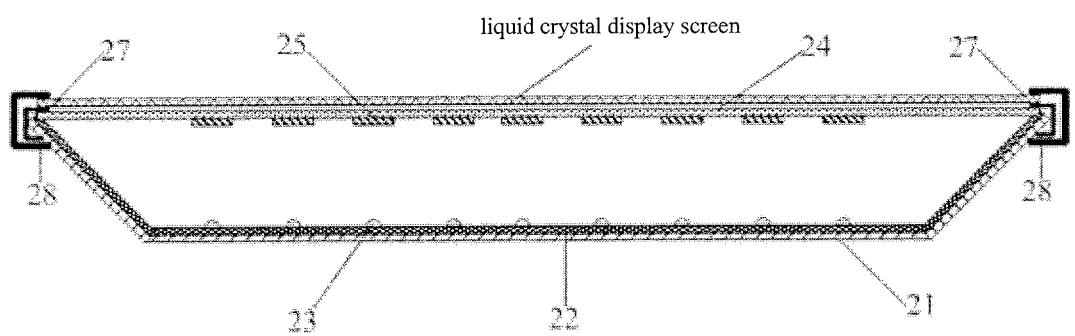
FIG. 6 is another schematic structural view of a backlight module according to an embodiment of the present disclosure.

In addition, the above backlight module provided by the embodiment of the present disclosure, as shown in FIG. 6, further includes a middle frame 27 for fixing the optical film 24 on the back plate 21, and a front frame 28 for fixing the backlight module and a display screen which is provided on a side of the light-emitting surface of the backlight module.

Based on one same inventive concept, a liquid crystal display device is further provided by embodiments of the present disclosure, including any one of the above backlight modules and a liquid crystal display panel which is provided on a side of the light-emitting surface of the backlight module. The liquid crystal display may be a liquid crystal panel, a liquid crystal display, a liquid crystal television and the like.

The backlight module and the liquid crystal display device provided in the embodiments of the present disclosure include: a back plate; a reflective sheet and a plurality of light sources sequentially disposed at one side of the back plate; and an optical film disposed at one side of the reflective sheet facing away from the back plate and at a given distance from the reflective sheet. The backlight module further comprises at least one transflective film disposed at one side of the optical film facing the light source. Since the transflective film may reflect a part of light emitted from the light source and then further reflect them with the reflective sheet of the backlight module, the angle at which the part of the light exits the LCD screen is enlarged. At the same time, the light mixing distance is increased without increasing the overall size of the backlight module, thereby improving the optical quality of the backlight module.

While an optional embodiment of the present disclosure has been described, those skilled in the art may further modify and substitute these embodiments once they understand the basic inventive concept. Therefore, the appended claims are intended to be interpreted as including alternative embodiments and all modifications and substitutions falling within the scope of the present disclosure.

Obviously, those skilled in the art may make various modifications and substitutions to the present disclosure without departing from the spirit and scope of the present disclosure. Thus, it is intended that the present disclosure cover the modifications and variations provided that these variations and substitutions of the present disclosure falling within the scope of the claims of the present disclosure and their equivalents.

What is claimed is:

1. A backlight module, comprising:
    a back plate;
    a reflective sheet and a plurality of light sources sequentially disposed at one side of the back plate; and
    an optical film disposed at one side of the reflective sheet facing away from the back plate and at a given distance from the reflective sheet,
    wherein the backlight module further comprises at least one transflective film disposed at one side of the optical film facing the light sources; and
    wherein the number of the transflective films is the same as the number of light sources, and the transflective films are arranged in a one-to-one correspondence with the light sources; and
    wherein each transflective film is in a shape of central symmetry, and an orthographic projection of a centroid of the transflective film on the back plate coincides with a light emission center of a corresponding light source; and
    wherein the transflective film is in a shape of circular or regular polygon, and
    wherein a maximum width of each transflective film and a maximum width of a corresponding light source satisfy a relation: $2H<L<6H$;
    where H is the maximum width of the light source and L is the maximum width of the transflective film, and
    wherein the transflective film is supported by a supporting member and the supporting member comprises a substantially cylindrical support disposed between the reflective sheet and the transflective film.

2. The backlight module according to claim 1,
    wherein an area of the transflective film is larger than an area of the light source.

3. The backlight module according to claim 2,
    wherein the optical film includes a prism sheet.

4. The backlight module according to claim 1,
    wherein the transflective film is directly attached to the optical film.

5. The backlight module according to claim 4,
    wherein the optical film includes a prism sheet.

6. The backlight module according to claim 1,
    wherein the optical film includes a prism sheet.

7. The backlight module according to claim 1, further comprising:
    a middle frame for fixing the optical film on the back plate, and
    a front frame for fixing the backlight module to a display screen provided on a side of the light-emitting surface of the backlight module.

8. A liquid crystal display device, comprising the backlight module according to claim 1.

* * * * *